MAGNETIC SHIFT REGISTER SYSTEMS

Filed Sept. 30, 1955 4 Sheets-Sheet 1

*INVENTOR.*
JOSEPH DEUTSCH
*BY* Laurence K. Brown
ATTORNEY

Oct. 28, 1958 J. DEUTSCH 2,858,526

MAGNETIC SHIFT REGISTER SYSTEMS

Filed Sept. 30, 1955 4 Sheets-Sheet 2

*INVENTOR.*
JOSEPH DEUTSCH
*BY* Laurence R. Brown
ATTORNEY

MAGNETIC SHIFT REGISTER SYSTEMS

Filed Sept. 30, 1955 4 Sheets-Sheet 3

INVENTOR.
JOSEPH DEUTSCH
BY Laurence R. Brown
ATTORNEY

Oct. 28, 1958 J. DEUTSCH 2,858,526

MAGNETIC SHIFT REGISTER SYSTEMS

Filed Sept. 30, 1955 4 Sheets-Sheet 4

INVENTOR.
JOSEPH DEUTSCH
BY Laurence R. Brown
ATTORNEY 2,858,526

MAGNETIC SHIFT REGISTER SYSTEMS

Joseph Deutsch, Berwyn, Pa., assignor to Burroughs Corporation, Detroit, Mich., a corporation of Michigan Application September 30, 1955, Serial No. 537,769

3 Claims. (Cl. 340—174)

This invenion relates to the storage of electrical signals in magnetic memory devices, and more particularly it relates to magnetic shift register systems and methods.

Although magnetic shift registers are well known in the art, there are attendant disadvantages in the use of such systems for the storage of large amounts of information. For example, in shifting stored magnetic information from one storage position to another, transfer loops are required which are critical in operation. The transfer loops must distinguish between signal and noise impulses, must have inherently low losses, and must work to match impedances of different magnetic storage elements. Thus, many restrictions are placed upon the operating parameters utilized in such transfer circuits. For example, in magnetic core storage systems in which information is shifted from one core to the next, diodes or other asymmetrical devices must be used in order to permit the transfer loop to recognize stored information of one polarity. Not only do these diodes produce circuit losses, but they may be critical in operation and subject to noise impulses, while at the same time contributing substantially to the cost of an overall system.

Furthermore, shift register systems which are constructed to store many bits of information are high in cost as compared with other types of information storage techniques such as coincident current magnetic matrices. Cost comparisons of core diode shift register memory with coincident current memory systems are made in an article entitled "Application and Performance of Magnetic Core Circuits in Computing Systems" by R. D. Kodis, published in the Proceedings of the Eastern Joint Computer Conference for December 8–10, 1954. On this basis, it is evident that where shift register operation is required for storage of large amounts of information in the prior art, it has been expensive. This is partially due to the requirement in magnetic core shift register systems for providing some sort of transient delay device between the core to which information is transferred and the core from which the information is derived. In many applications this requirement has resulted in the provision of shift registers necessitating two cores per bit of stored information together with coupling diodes in the transfer circuits. However, where it is desirable to monitor information at a plurality of stations separated from each other a fixed number of information units, shift registers are required.

It is, accordingly, an object of the present invention to provide simplified and low cost shift register systems and methods for storage of large amounts of information.

It is another object of the invention to provide improved shift registers which require only one core per bit of stored information and which are not subject to transfer noise impulses.

Another object of the invention is to provide systems for the storage of large amounts of information which may be monitored at a plurality of stations separated by a fixed number of units of information.

A still further object of the invention is to provide shift register systems employing coordinate conductor type of matrix memory system.

In accordance with the present invention, therefore, a magnetic shift register system is utilized which permits the information to remain stationary in a resident core until actually used. When the information is taken from a bit core for use, it is then shifted to a monitoring station and is replaced in a further memory core. Thus, a plurality of matrix coordinate conductor memory arrays may be coupled so that information is read from one coordinate position of one array to the same corresponding coordinate position of a further array. The separate positions of each array are thus scanned simultaneously with a single scanning device so that information stored in the matrix memory may be sequentially produced at any of the fixed monitoring stations coupling one array to the next. In one simple form, the principles of the present invention may be embodied in a system wherein magnetic elements are used for storage of information, and the scanning or shifting operation for presenting the stored data in serial form comprises a sequentially actuated read out means for scaning the array of cores and reading out information from one core at a time.

The organization and operation of the invention together with further objects and features of advantage are discussed with reference to the accompanying drawings, wherein.

Figure 1A:
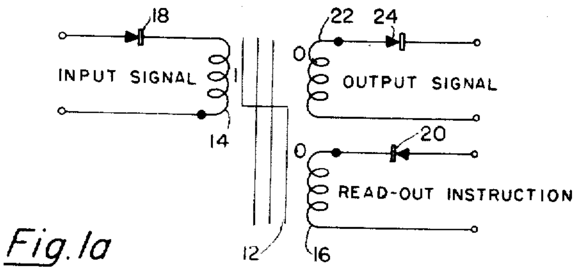
Fig. 1 is a schematic and logical representation of a magnetic storage element used in connection with the present invention.
Figure 1B:
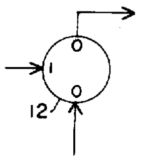

Magnetic storage elements of the type shown in Fig. 1 are well known in the art. However, in order to more fully understand the invention and its operation, reference is made to the magnetic core binary storage element 12 of Figs. 1*a* and 1*b* and those operational characteristics which are utilized in connection with the present invention. In general, the schematic circuit of Fig. 1*a* is identical with the simplified logical representation of Fig. 1*b*. Thus, in Fig. 1*b* the input arrows to the core 12 are representative of windings for respectively storing "1" or "0" signals in the core. These arrows correspond to windings 14 and 16 of Fig. 1*a*, in which the winding polarity is designated by a dotted winding terminal. The convention used in this circuit is exemplified by the direction of current flow established by the diodes 18 and 20. Thus, current flowing through the diodes in a forward direction when entering an undotted terminal, will establish a stored signal of "1" polarity whereas current flow into a dotted terminal will cause a signal of "0" polarity to be stored in the magnetic core element 12. Likewise the lead leaving the core 12 of Fig. 1*b* represents the output signal winding 22 of Fig. 1*a* together with the diode 24. This diode 24 is poled to produce an output signal when the magnetic element is switched from a "1" to a "0" storage state. Thus, by providing a read out instruction current at the winding 16, an output signal is produced if the core is in a resident "1" state and is switched to the "0" state by the read out instruction. An input signal at winding 14 may be caused to store information in the magnetic core element 12 after it is reset to its "0" condition by the read out instruction at winding 16.

The signal at winding 14 is sufficient to provide enough magnetic flux to establish a remanent flux of "1" polarity in the core of element 12, which is constructed of a material having a substantially rectangular hysteresis characteristic. The flux can be applied at a single winding such as 14 or at a plurality such as two input windings which serve to establish the remanent "1" in the core only when input signals are provided at both windings. Because of the substantially rectangular hysteresis characteristic, one of the signals alone at one winding of this type of storage device will not serve to cause appreciable change in the remanent magnetic condition of the core. The latter technique is used in connection with well known magnetic storage systems of the coincident current type such as described in the article entitled "A coincident current magnetic memory cell for the storage of digital information" published in the Proceedings of the I. R. E., vol. 40, page 475–478, April 1952. As shown in such articles, the same windings used for storing information may likewise be used for providing the read out instruction. In general, it is desirable however, to provide separate output windings for reasons which will hereinafter be evident, and for the purpose of isolating the storage signals from the possible transient noise conditions found in the signals utilized for storing and reading out information. In general, the coincident coordinate type memory system is utilized without the provision of diodes, and in such cases the information at any particular coordinate is determined by a timed gating of output signals designating the particular coordinate cores being read.

The operational principles of the present invention are first described in connection with the type of cores shown in Fig. 1a, as are more commonly used in connection with existing magnetic shift register systems. Thus, in Fig. 2 a magnetic shift register system is shown wherein the information is left resident in each of the cores 30, 32, 34 and 36 until called for use in the utilization circuit 38. In shift register applications of the prior art it is customary to shift the information from one magnetic storage element to the next, and to couple only one magnetic storage element to a utilization circuit to provide thereat a sequence of stored bits of information shifted out in serial. In connection with the embodiment of Fig. 2, however, information is stored in the magnetic elements 30, 32, 34 and 36 from any suitable signal source 40 and retained resident until called for. The information may be derived sequentially or simultaneously from source 40 for storage in all of the elements at the separate input windings to establish a resident state of "1" in any core in response to an input signal at that core. The cores are cleared by the sequential read out generator 42 into a receptive "0" state so that the lack of information from the signal source 40 will leave a resident "0" in the appropriate cores. By means of the sequential read out generator, which could be in one simple embodiment a rotary switch, a saturating current is connected to the windings of the cores 30, 32, 34 and 36 in succession at sequential time period $t_1$, $t_2$, $t_3$, and $t_4$. Thus, at time $t_1$ the information is read out of core 30, at time $t_2$ the information is read out of core 32, etc. By means of a mixer circuit 44, which couples together all the output windings of the respective cores 30, 32, 34 and 36, the stored signals will be shifted out and presented sequentially to the utilization circuit 38 in the same manner as if the information had been shifted from core to core. It is evident that the storage of information in magnetic shift registers is thus simplified since transfer loops between the respective cores need not be provided and only a single core per bit of stored information is necessary. When the cores are used in an existing system, the provision of separate sequentially timed read out instructions from generator 42 may not be necessary since similar signals may already be present for other circuit operations to thereby produce an efficient system for the storage of even a small number of bits of information. In operation, the utilization circuit 38 is generally synchronized to operate upon each portion of sequentially presented stored information by means of some intermediate synchronizing circuit 46.

Figure 3:
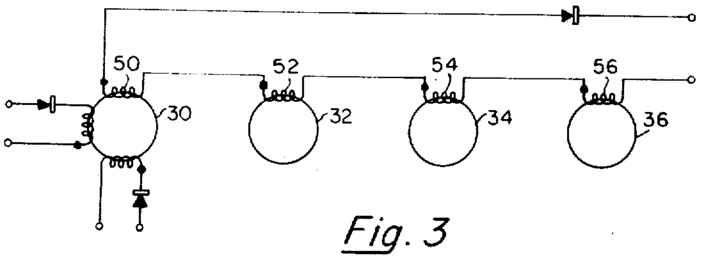
Fig. 3 is a schematic circuit diagram of a read out circuit employed in connection with the invention.

As seen from the circuit embodiment of Fig. 3, the mixer circuit 44 may simply comprise the series connection of windings 50, 52, 54 and 56 respectively located about the corresponding cores. It is clear from a consideration of the embodiments of Figs. 2 and 3 that in accordance with the present invention the shifting of information out of a plurality of cores in serial sequential form is produced by scanning a plurality of cores in sequence with a read out signal rather than by shifting the information from core to core.

Figure 4:
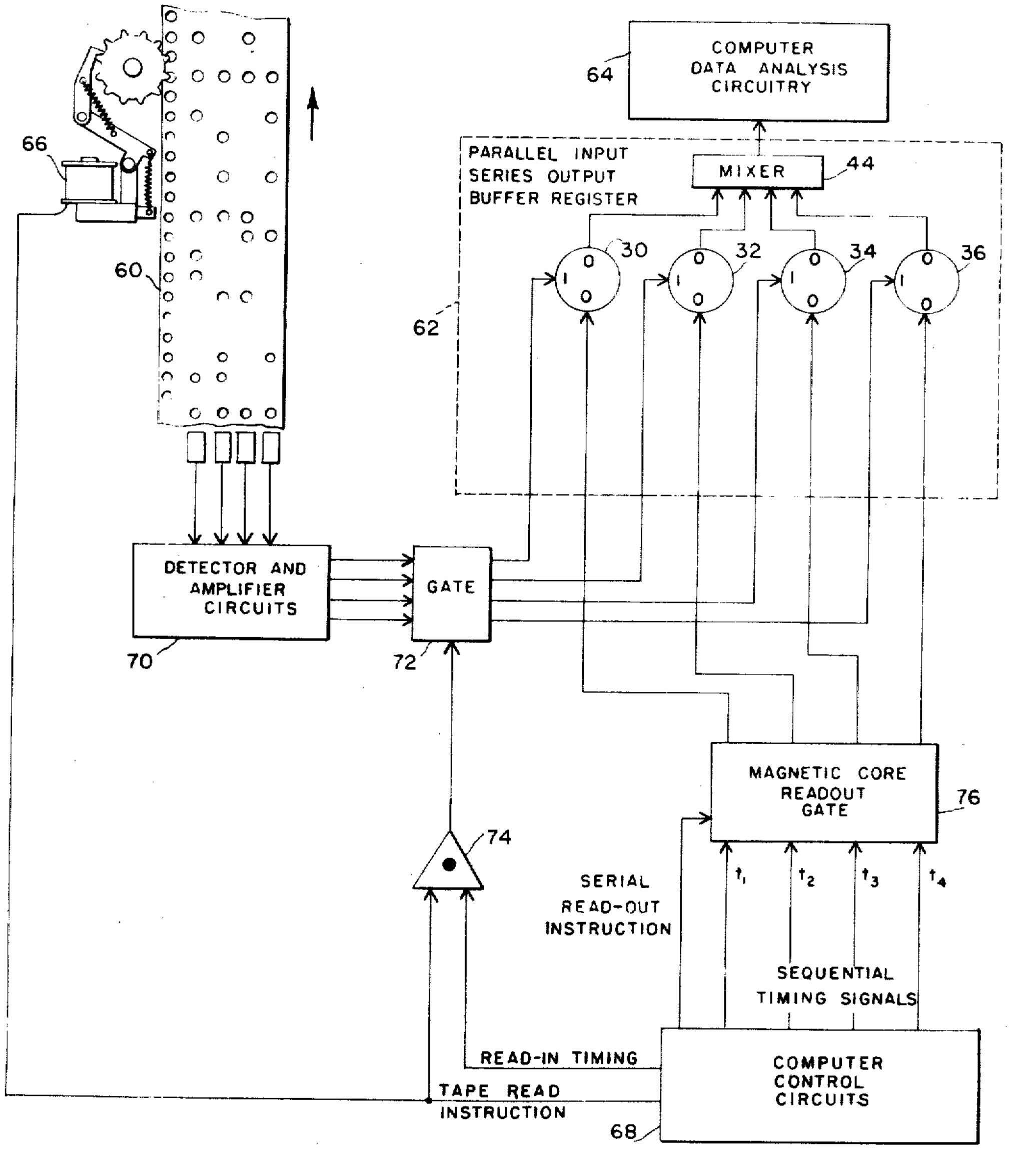
Fig. 4 is a logical block diagram of a computer system employing the invention.

From a consideration of the system of Fig. 4 it is seen that the techniques of the present invention might have use in the processing of information in an electronic computer system. Thus, the simplified system shown exemplifies the advantage of magnetic core storage in converting information taken from an asymmetrically moving coded tape 60 into a serially presented synchronized signal derived in the circuit 62 for presentation and use for data analysis in computer circuitry 64. In a system of this type the tape 60, because it is mechanically moved, is presented relatively slowly as compared to operation of electronic computer circuits. Thus, it is advanced by means of some synchronously actuated relay circuit 66 or the like, at the instruction of computer control circuits 68, for presentation of several bits of information in parallel at the detecting and amplifying circuits 7. The information is then read by means of the gate 72 into the corresponding magnetic storage element 30, 32, 34 and 36 at a time established by the computer control circuit 68 through medium of the gating circuit 74. After the information is read into the cores, it is converted into serial information at the mixer circuit 44 by means of sequential timing signals from the computer control circuit 68 at the read out gate 76 in the manner described in connection with Fig. 2, so that the computer data analysis circuitry 64 may utilize the information synchronously at maximum efficiency. Thus, it is clearly evident that techniques of the type taught in the present invention may be utilized to provide buffer storage between some type of a synchronously presented information device and a synchronously operated information utilization device.

Figure 5:
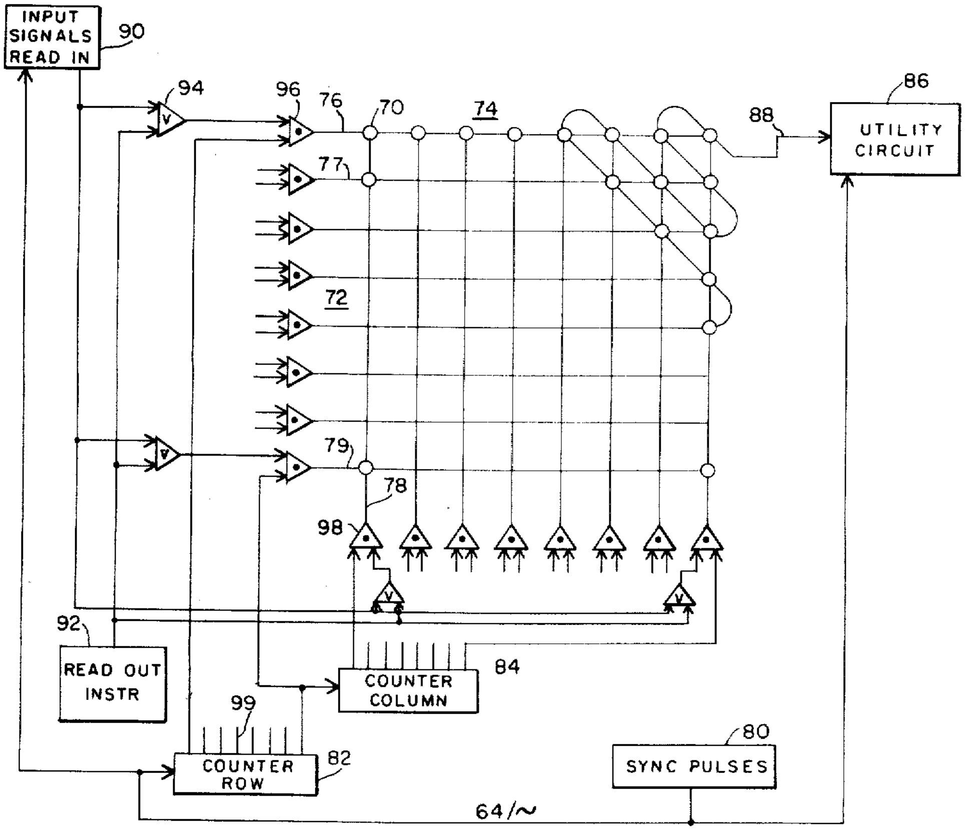
Fig. 5 is a logical diagram of a coordinate conductor matrix memory system as used with the present invention.

In the previously discussed embodiment, simplicity of presentation has been emphasized in order to provide a basic understanding of the operational principles of the novel magnetic storage operation of this invention. However, in many applications, the requirement for handling large amounts of stored information requires more complex circuit arrangements. In this case, matrix memory systems of the type described in Fig. 5 are employed in connection with the invention. The general operation of matrix memory systems is well known and therefore is not discussed in detail. However, each of the magnetic cores are designated at the circles 70 etc., and each core is defined by a unique coordinate position determined by one of the row conductors 72 and column conductors 74. Accordingly, if a signal is presented in the first row conductor 76 and the first column conductor 78, the coordinate core 70 will be selected. By means of a synchronizing pulse circuit 80 and a corresponding pair of sequentially actuated cascaded coupled row and column counters 82 and 84, the utilization circuit 86 may be made to distinguish by timed differentiation between the respective coordinate positions even though a single output lead 88 is coupled simultaneously in series with all of the matrix cores in a manner similar to that shown in Fig. 3. The individual coordinate rows and columns may be used for either storing input signals from source 90 or for reading out stored signals by means of the read out instruction source 92 as provided by the mixer or logical "or" circuits 94. For simplicity of the drawing, duplicate circuit elements are not completed throughout the drawing, but are shown in diagrammatic form with typical circuits connected to simplify the presentation and understanding of the invention.

As will hereinafter be shown, the information may be first read out and then new information put in at the same coordinate position during the same selection cycle. Thus, in an 8 by 8 matrix array of the type shown, the 64 synchronization pulses per scanning cycle, two 8 position distributing counters 82 and 84 are coupled in cascade. Thus, the first 8 pulses applied from the synchronizing pulse source 80 to the row counter 82 will cause each of the successive rows 76, 77 etc. to be scanned in sequence. As the last or eighth row 79 is scanned, the column counter 84 is caused to step one position. Therefore, a total of 64 pulses is necessary to scan all of the combinations of rows and columns to define individually each of the 64 storage elements of the matrix array. The "and" gating circuits 96 and 98 are provided respectively in the rows and columns for assuring that the counter circuits select the proper coordinate without disturbing the storage state of the magnetic core located in that coordinate. Thus, the gates 96 and 98 are open only in connection with a coinciding read out instruction or input signal which is caused to tend to change the storage state of the magnetic core in a corresponding direction. It is clear, therefore, from consideration of this embodiment that by coupling counters 82 and 84 for sequential scanning in a predetermined pattern of each of the elements of the matrix memory array, the advantages of shift register operation are attained while utilizing the economic savings mentioned in connection with the above identified Kodis article.

Figure 6:
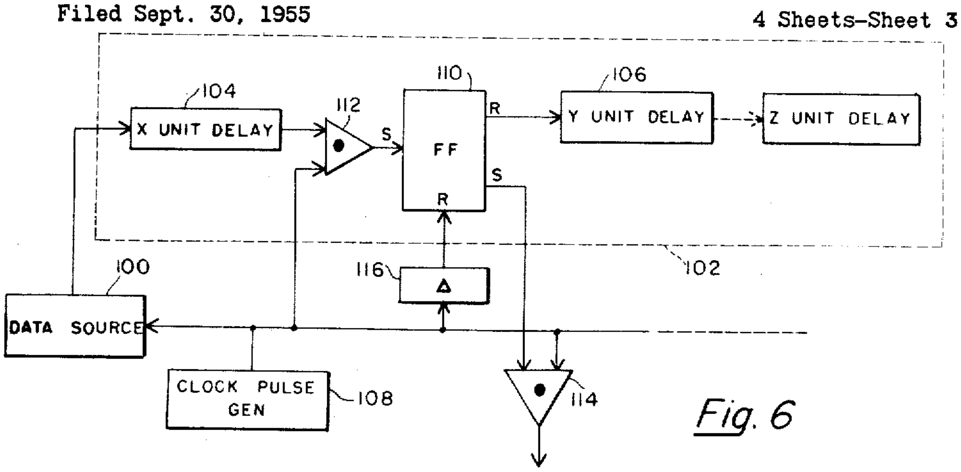
Fig. 6 is a block diagram of a typical shift register storage system for large amounts of information.

In general shift register operation, information may be desired at a plurality of different stations located at different positions along the shift register. Thus for example, in electronic computer operation, one circuit may be required to work with a particular number of binary bits representing a decimal digit at a time proceeding that in which the same information may be called for with a series of decimal digits in a statistical figure which is presented along the shift register at a later time. In Fig. 6, a system of this type is diagrammatically shown in block form. Thus, a data source 100 provides serial information for presentation to the magnetic shift register 102. A plurality of stations along the shift register are each defined by corresponding ones of successive blocks of magnetic elements designated as unit delay lines 104, 106 etc. These delay lines may arbitrarily comprise any number of magnetic elements. For example, the first delay unit 104 might provide the delay necessary for providing information one decimal digit removed from the input signals of data source signals 100 whereas delay unit 106 may be utilized to provide a delay of one statistical entry of twelve decimal digits removed from the signals provided at the output station defined by delay unit 104. In this system as in any other corresponding system, synchronous operation is attained in a conventional manner by means of the clock pulse generator 108.

Figure 2:
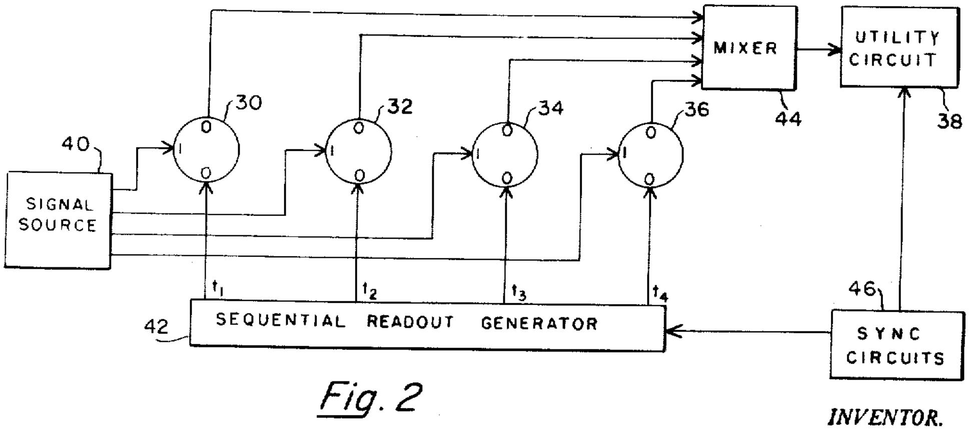
Fig. 2 is a logical circuit diagram of a system operable in accordance with the present invention.

It is assumed that each of the delay units 104 etc. comprises a small shift register unit of the type described in connection with Fig. 2 or Fig. 5. Information is thereby transferred from one delay unit to the next by means of an intermediate storage device such as flip-flop circuit 110, which is designated to hold the information presented by one delay unit until the succeeding delay unit has been prepared to receive the information. Thus, assume that information from delay unit 104 is presented by gate 112 to the set terminal of flip-flop circuit 110 upon arrival of clock pulses from generator 108. As the flip-flop circuit is set, an output pulse may be produced by the output gate circuit 114. After a suitable time delay in order to provide time to extract information at the gate 114, as provided by delay circuit 116, the flip-flop circuit 110 may be reset to thereby store the information in the succeeding delay unit 106. In this way information is transferred from one delay unit to the other and made available for use at the intermediate stations. It is to be understood that other techniques than the particular operation of the flip-flop circuit herein described may be utilized for intermediate storage of the information without departing from the spirit or the scope of the present invention.

In order to provide operation with arbitrary numbers of units delay of the type described in connection with Fig. 6 with standard elements in a matrix memory type system of the nature shown in Fig. 5, any count may be produced by causing the matrix counter to reset the coordinate system to zero after the required predetermined count. Assume for example, in connection with Fig. 5, that a reset were desirable after a count of 60. Thus, the signal at the last counter column lead 97 together with the signal at the fourth counter row lead 99 would be used at a gating circuit to reset the counters to the first row and the first column. This operation would provide the advantage that each of the matrix arrays in a large system would be identical even though odd counts were required. It is to be noted, however, that for each memory section designed for operation with different numbers of units, separate driver circuits are necessary for selecting the rows and columns of each coordinate position. Thus, for example, in Fig. 6 the unit delay register 104 would require a system as shown in Fig. 5 were it to comprise 64 bits in length. However, should the Y unit delay 106 of Fig. 6 require a delay of 60 bits, a further counter would be required as hereinbefore described. As will be shown in connection with Fig. 7, advantages in circuit economy will be present wherever it is possible to group a plurality of matrix sub-units having the same coordinate relationship in that a single row and column selecting system may be used for a large number of identical sub-matrix units.

Figure 7:
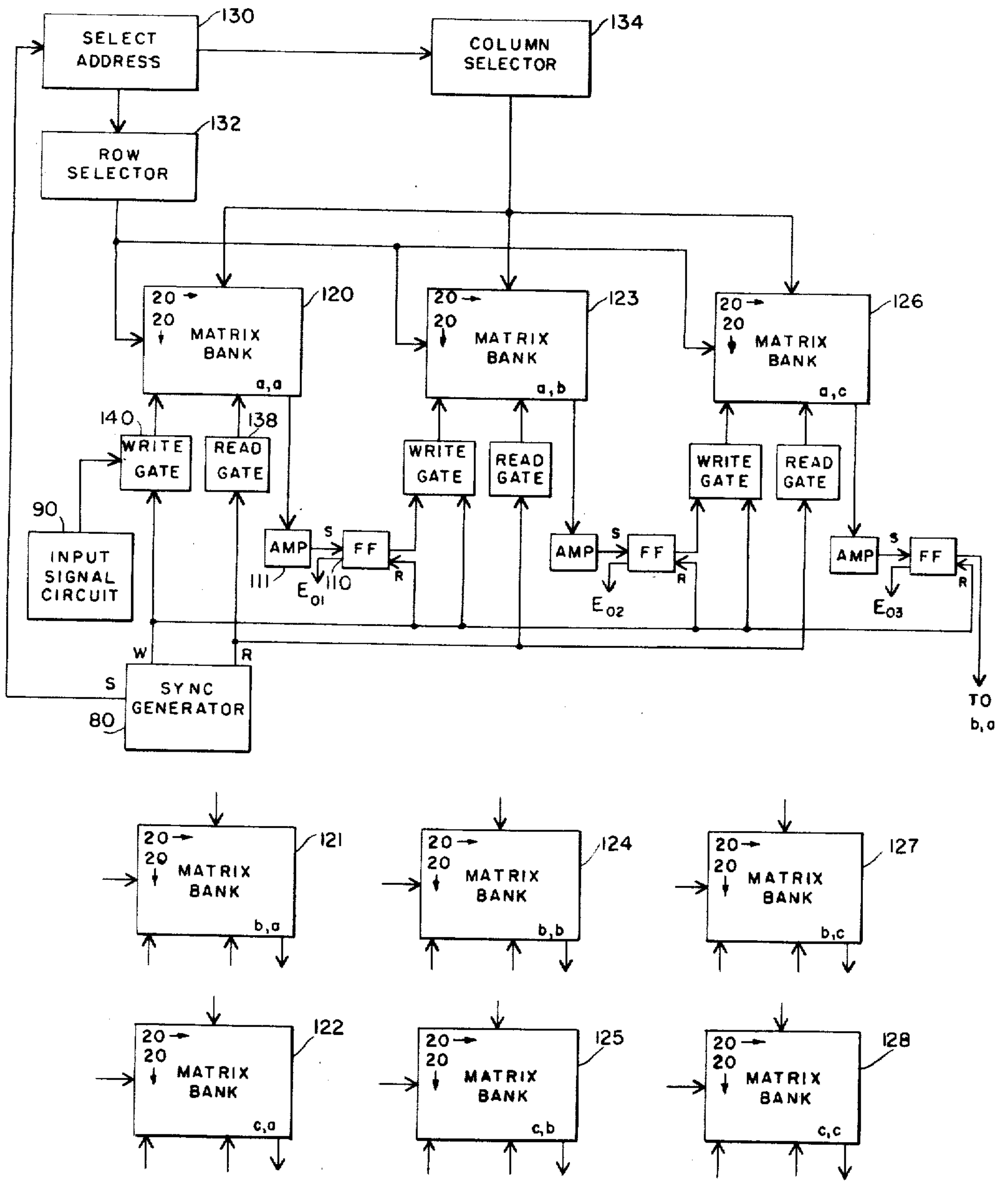
Fig. 7 is a block diagram of a magnetic matrix storage system embodying the invention.
Figure 7:
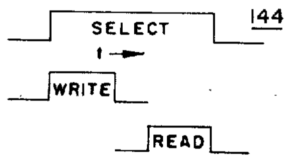

For a typical system for performing the function of Fig. 6 in an economic manner, the array of Fig. 7 may be considered. This array is considered in connection with a 60 by 60 matrix of magnetic cores broken up into 9 sub-sets of 20 by 20 matrices 120 through 128. To simplify the presentation operation of the sub-sets 120, 123 and 126 is described to typify the same operation in connection with any desired number of similar sub-sets of magnetic matrices. It is noted that a single address selection means 130 is used for defining the same row and column in each of the matrix banks. Thus, for the shown array of 3600 cores, 20 circuits are necessary in the row selector system 132 as well as in the column selector system 134 to define the same corresponding coordinate positions in each of the 20 by 20 sub-matrices of the entire shift register system. The synchronizing circuit 80 together with the read and write circuits 138 and 140 operate in connection with the input signal circuit 90 in the same general manner described in connection with Fig. 5 to produce input information at the first submatrix array 120. As shown by the waveforms 144, the reading and writing cycles are made in sequence during the address selection period so that information is first read from a corresponding coordinate position and then is written into the same position. This phasing may be readily accomplished by well known synchronization circuits associated with the overall synchronization pulse generator 80. A temporary storage device such as flip-flop circuit 110 is used to couple the shift register submatrix sections in the manner described in connection with Fig. 6. If desired, an amplifier 111 may be provided to maintain the proper signal amplitudes throughout the system or for purposes of impedance matching between magnetic cores and flip-flop circuits where necessary. It is evident from consideration of the circuit of Fig. 7 that information may be selected in the same coordinate of banks 120, 123 and 126 at the same address selection interval. During the first portion of the address selection cycle, therefore, information is read from each sub-matrix into the corresponding flip-flop circuit where it is stored until the subsequent write instruction is received for restoring the read out information into the same coordinate of a further sub-matrix section. Thus, even through the information is maintained in each magnetic core during the entire storage interval until it is called for use, the circuit functions as a shift register and therefore provides many attendant advantages over existing shift register systems which require transferring of information from element to element. Accordingly, it is evident that novel storage systems are provided in accordance with the present invention, which have utility and advantage over prior art devices. Accordingly, those novel features believed descriptive of the nature and scope of the invention are defined with particularity in the appended claims.

What is claimed is:

1. A magnetic shift register system for storing *y* binary digits and producing access for information at stations *n* binary digits apart comprising in combination, a magnetic memory matrix for storing *y* digits divided into a plurality of matrix sections each for storing *n* digits, means for simultaneously selecting a corresponding matrix row and column coordinate in each section, means for reading out simultaneously the information stored at said selected matrix row and column coordinate of each section, means for individually storing the read out information of at least one section, and means for reading the information from one of the storage means into a corresponding row and column location in another of the matrix sections.

2. A magnetic shift register system for producing serial binary bits of stored information at a plurality of fixed stations, comprising in combination, a plurality of arrays of magnetic cores with each array arranged with an individual pair of coordinate conductors defining each of the individual cores contained in the array, means for selecting in succession for a predetermined time period the pair of conductors of each array defining corresponding individual cores, means for reading information out of each array in response to selection of the corresponding conductors during a first portion of said time period, means for retaining the information read out of each array, and means for shifting the retained information of at least a portion of the arrays into the corresponding selected cores of a different array during a second portion of said time period.

3. A matrix memory array operating as a shift register comprising, means dividing the matrix array into a plurality of sub-sets, means for selecting for a time interval corresponding coordinate storage positions in all the sub-sets simultaneously, means for reading out the information of the selected coordinates of each sub-set during the first portion of said time interval, means for storing the information read out, and means for reading the stored information back into the same coordinate position of a different sub-set from which other information was previously read out.

References Cited in the file of this patent

UNITED STATES PATENTS 2,719,961 Karnaugh ---------------- Oct. 4, 1955
2,734,187 Rajchman ---------------- Feb. 7, 1956
2,740,110 Tremble ---------------- Mar. 27, 1956